(12) United States Patent
Tsujii (10) Patent No.: US 8,733,159 B2
(45) Date of Patent: May 27, 2014

(54) AIR FLOW MEASURING DEVICE

(75) Inventor: Hidehito Tsujii, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/602,470

(22) Filed: Sep. 4, 2012

(65) Prior Publication Data

US 2013/0055799 A1   Mar. 7, 2013

(30) Foreign Application Priority Data

Sep. 5, 2011 (JP) ................................. 2011-193257

(51) Int. Cl.
G01M 15/04 (2006.01)
(52) U.S. Cl.
USPC .................... 73/114.32; 73/204.21; 73/204.22
(58) Field of Classification Search
USPC ................... 73/114.32, 202.5, 204.21, 204.22
See application file for complete search history.

(56) References Cited

U.S. PATENT DOCUMENTS

| | | | | |
|---|---|---|---|---|
| 5,467,648 A | * | 11/1995 | Igarashi et al. | 73/202.5 |
| 6,332,356 B1 | * | 12/2001 | Hecht et al. | 73/202.5 |
| 6,422,070 B2 | * | 7/2002 | Reymann et al. | 73/114.34 |
| 6,786,089 B2 | * | 9/2004 | Goto et al. | 73/204.21 |
| 6,868,722 B2 | * | 3/2005 | Tanimoto et al. | 73/202.5 |
| 6,915,682 B2 | * | 7/2005 | Renninger et al. | 73/114.34 |
| 7,124,626 B2 | * | 10/2006 | Lenzing et al. | 73/114.32 |
| 7,926,343 B2 | * | 4/2011 | Ariyoshi et al. | 73/202.5 |
| 7,963,161 B2 | * | 6/2011 | Morino et al. | 73/202.5 |
| 2003/0159501 A1 | * | 8/2003 | Renninger et al. | 73/118.2 |
| 2003/0182998 A1 | * | 10/2003 | Goto et al. | 73/204.21 |
| 2004/0074291 A1 | * | 4/2004 | Lenzing et al. | 73/118.1 |

FOREIGN PATENT DOCUMENTS

JP     2005-128038     5/2005

OTHER PUBLICATIONS

Office Action (2 pages) dated Sep. 24, 2013, issued in corresponding Japanese Application No. 2011-193257 and English translation (3 pages).

* cited by examiner

*Primary Examiner* — Freddie Kirkland, III
(74) *Attorney, Agent, or Firm* — Nixon & Vanderhye, P.C.

(57) ABSTRACT

An air flow measuring device includes a measured passage and a sensor portion. Measured air which is a measuring object flows through the measured passage. The sensor portion is disposed in a sensor arrangement portion of the measured passage and is configured to measure a flow rate of measured air flowing through the measured passage. The measured passage includes an upstream bent portion on an upstream side of the sensor arrangement portion in a flow direction of measured air. The upstream bent portion includes an upstream throttle that partly decreases a passage area of the measured passage.

20 Claims, 5 Drawing Sheets

FIG. 5  PRIOR ART

AIR FLOW MEASURING DEVICE

CROSS REFERENCE TO RELATED APPLICATION

This application is based on Japanese Patent Application No. 2011-193257 filed on Sep. 5, 2011, the disclosure of which is incorporated herein by reference.

TECHNICAL FIELD

The present disclosure relates generally to a device that measures an air flow rate. In particular, the present disclosure relates to a technology suitable to be used for measurement of a flow rate of air (intake air amount) drawn into an engine (internal combustion engine which generates rotative power as a result of combustion of fuel).

BACKGROUND

Figure 4:
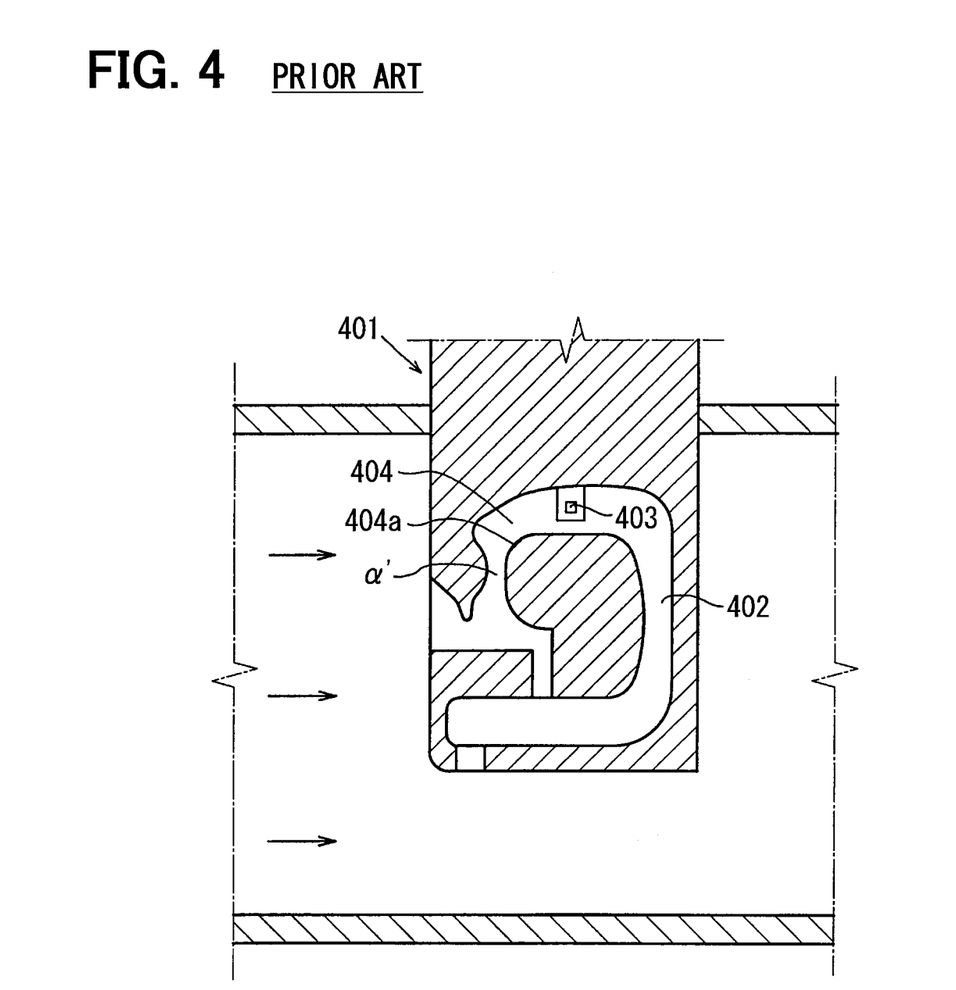
FIG. 4 is a sectional view roughly illustrating an air flow measuring device in accordance with a first conventional technology.
Figure 5:
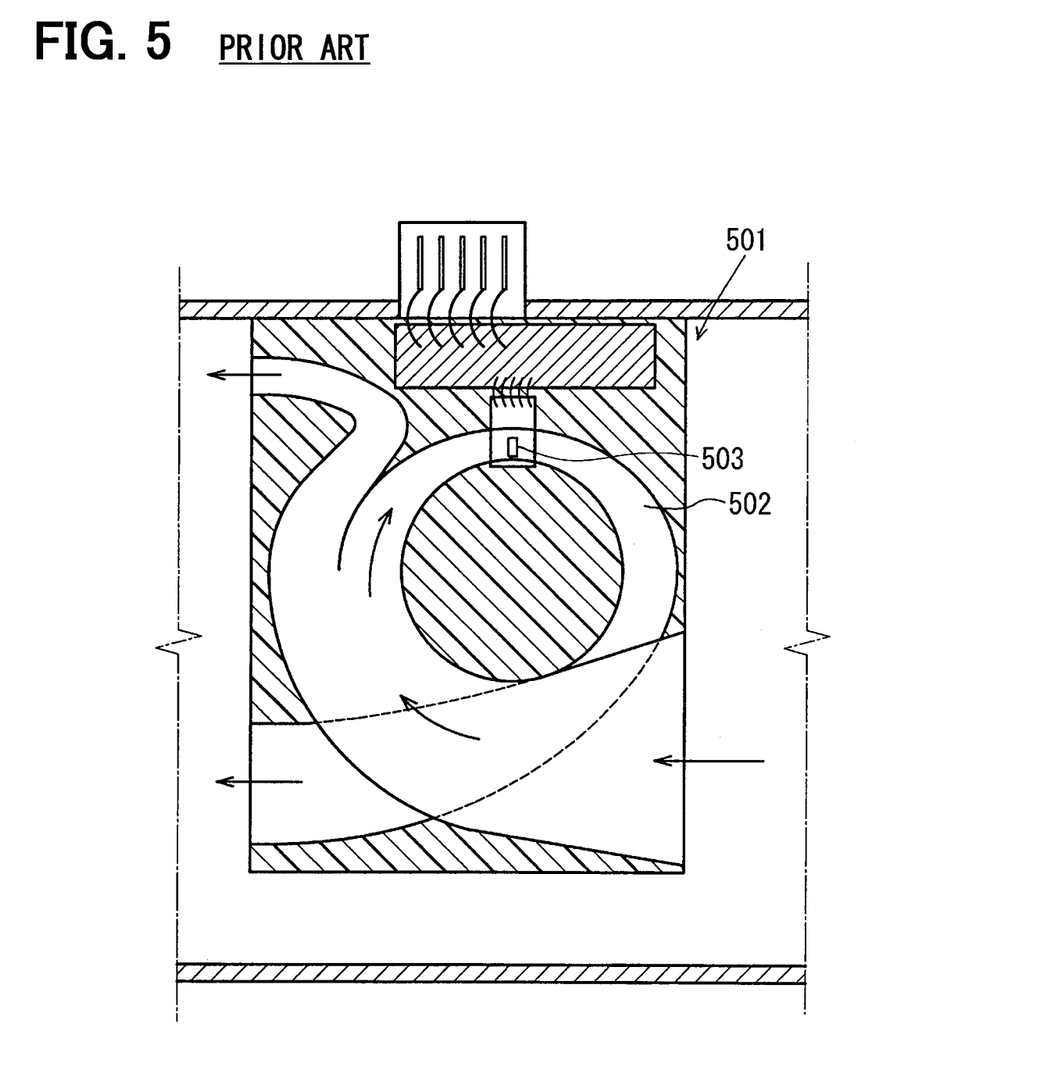
FIG. 5 is a sectional view roughly illustrating an air flow measuring device in accordance with a second conventional technology.

First and second conventional technologies for an air flow measuring device will be described in reference to FIGS. 4 and 5.

The first conventional technology will be explained below. In an air flow measuring device 401 illustrated in FIG. 4, a sensor portion 403 is disposed in a measured passage 402 (passage through which measured air that is a measuring object flows), and an upstream bent portion 404 is provided at an upstream region (upstream in the measured air) of a sensor arrangement portion (region where the sensor portion 403 is disposed) (see JP-T-2004-519690 corresponding to US2003/0159501A1). In this technology described in JP-T-2004-519690, an upstream throttle α' that reduces a passage area is provided at a further upstream region of the upstream bent portion 404, and an airflow toward the sensor portion 403 is straightened through this upstream throttle α'. Therefore, in the measured passage 402 of JP-T-2004-519690, the upstream throttle α', the upstream bent portion 404, and the sensor arrangement portion are arranged in this order along a flow direction of the measured air.

However, according to the technology in JP-T-2004-519690, due to the upstream bent portion 404 between the upstream throttle α' and the sensor arrangement portion, when air is exfoliated on an inner wall surface 404a of the upstream bent portion 404, a flow of air toward the sensor arrangement portion is disturbed. Accordingly, a defect of an increased fluctuation of output from the sensor portion 403 is caused (increased variation in output characteristics and deteriorated output fluctuation).

The second conventional technology will be explained below. In an air flow measuring device 501 illustrated in FIG. 5, a sensor portion 503 is disposed at a curved portion of a measured passage 502 (see JP-A-2008-197122 corresponding to U.S. Pat. No. 6,332,356B1). In this technology described in JP-A-2008-197122, the measured passage 502 on an upstream side of the sensor portion 503 is provided to gradually reduce a passage area up to the sensor portion 503, and an airflow at a sensor arrangement portion is thereby straightened.

However, according to the technology in JP-A-2008-197122, the reduction of the passage area converges at the sensor arrangement portion, so that passage resistance is increased through the measured passage 502, which changes pulsation characteristics. Furthermore, in the technology of JP-A-2008-197122, because the throttle is only in one direction perpendicular to a sensor opposing direction, a defect of an increased output fluctuation of the sensor portion 503 is caused (increased variation in output characteristics and deteriorated output fluctuation).

SUMMARY

According to the present disclosure, there is provided an air flow measuring device including a measured passage and a sensor portion. Measured air which is a measuring object flows through the measured passage. The sensor portion is disposed in a sensor arrangement portion of the measured passage and is configured to measure a flow rate of measured air flowing through the measured passage. The measured passage includes an upstream bent portion on an upstream side of the sensor arrangement portion in a flow direction of measured air. The upstream bent portion includes an upstream throttle that partly decreases a passage area of the measured passage.

According to the present disclosure, there is also provided an air flow measuring device including a measured passage and a sensor portion. Measured air which is a measuring object flows through the measured passage. The sensor portion is disposed in a sensor arrangement portion of the measured passage and is configured to measure a flow rate of measured air flowing through the measured passage. The sensor arrangement portion includes a sensor throttle that decreases a passage area of the measured passage. The measured passage on a downstream side of the sensor arrangement portion in a flow direction of measured air includes a downstream throttle that decreases the passage area. The sensor throttle and the downstream throttle are formed continuously in the flow direction of measured air.

According to the present disclosure, there is further provided an air flow measuring device including a measured passage and a sensor portion. Measured air which is a measuring object flows through the measured passage. The sensor portion is disposed in a sensor arrangement portion of the measured passage and is configured to measure a flow rate of measured air flowing through the measured passage. The measured passage includes a downstream bent portion on a downstream side of the sensor arrangement portion in a flow direction of measured air. The downstream bent portion includes a downstream throttle that partly decreases a passage area of the measured passage.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
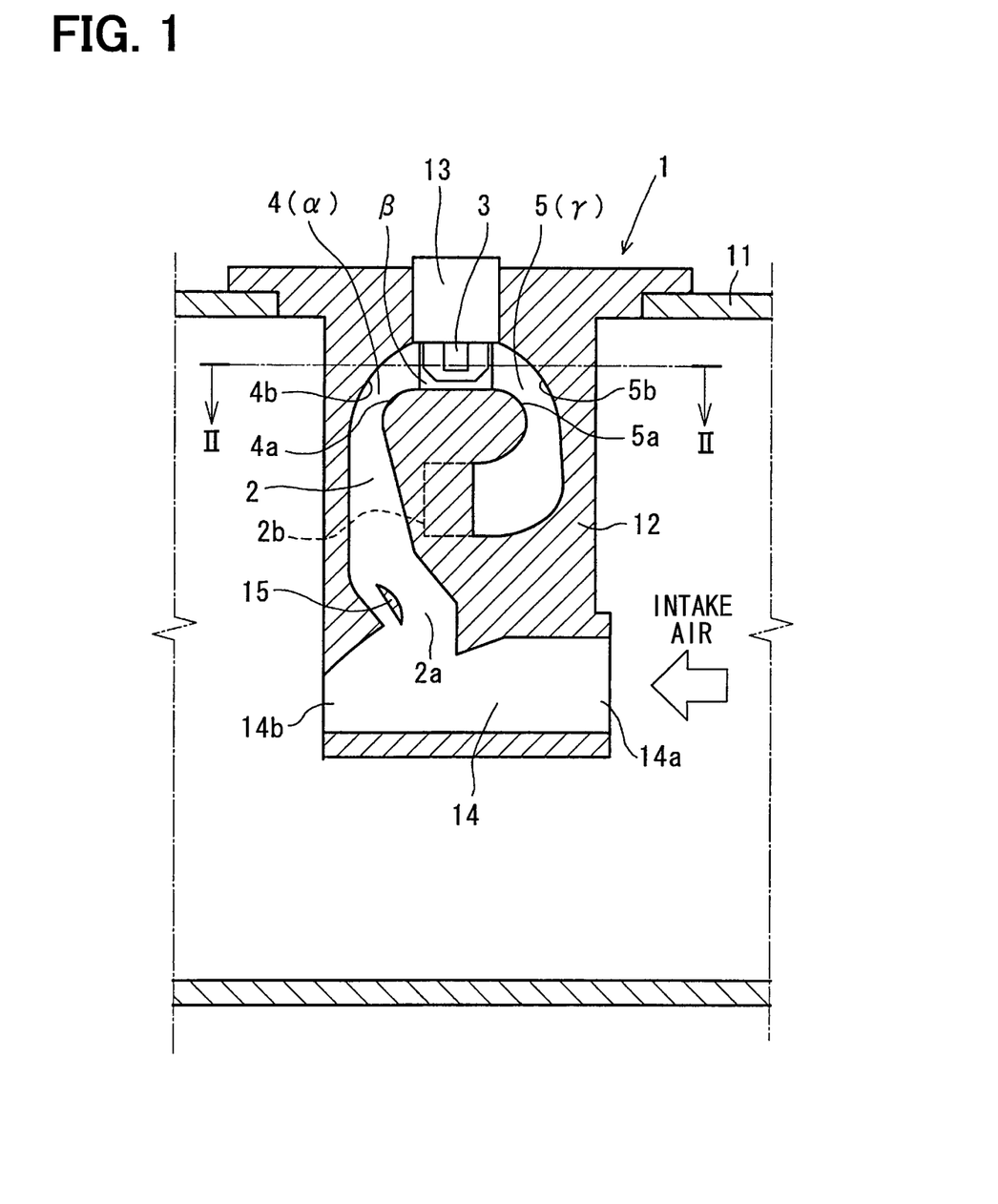
FIG. 1 is a sectional view roughly illustrating an air flow measuring device in accordance with an embodiment.

An air flow measuring device 1 of an embodiment is disposed in a measured passage 2 through which measured air that is a measuring object flows, and includes a sensor portion 3 that measures a flow rate of measured air flowing through this measured passage 2. An upstream bent portion 4 is provided in the measured passage 2 on an upstream side (upstream side in the measured air flow direction) of a sensor arrangement portion where the sensor portion 3 is arranged. Moreover, a downstream bent portion 5 is provided in the measured passage 2 on a downstream side (downstream side in the measured air flow direction) of the sensor arrangement portion.

An upstream throttle $\alpha$ that partly (locally) reduces a passage area is provided along the passage of the upstream bent portion 4. A sensor throttle $\beta$ that reduces the passage area is provided at the sensor arrangement portion. A downstream throttle $\gamma$ that partly (locally) reduces the passage area is provided along the passage of the downstream bent portion 5.

The inner wall surface 4a of the bent portion 4 may be formed to be a smooth curved surface (such as R surface) to prevent exfoliation of an airflow from an inner wall surface 4a of the upstream bent portion 4. Similarly, the inner wall surface 5a of the bent portion 5 may be formed to be a smooth curved surface (such as R surface) to prevent exfoliation of the airflow from an inner wall surface 5a of the downstream bent portion 5.

A specific example (embodiment) will be described below in reference to the accompanying drawings. The embodiment discloses a concrete example, and needless to say, the disclosure is not limited to the following embodiment.

The air flow measuring device 1 of this embodiment is disposed in an air intake duct 11 of an engine for vehicle traveling. The device 1 is an air flow meter (AFM) that measures a flow rate of air drawn into the engine (intake air amount). The air flow measuring device 1 includes a passage forming member 12 (housing) that is attached to the air intake duct 11, and a sensor assy 13 attached to this passage forming member 12. The sensor portion 3 is disposed in this sensor assy 13.

The passage forming member 12 is formed from, for example, a resin material, and is attached to the air intake duct 11 which guides intake air to the engine. A sub-air passage 14 (bypass passage) and a secondary sub-air passage 2 (sub-bypass passage which may correspond to the measured passage) are defined inside the passage forming member 12. A part of air flowing through an inside (main air passage) of the air intake duct 11 passes through the sub-air passage 14 and the secondary sub-air passage 2. Specifically, an AFM insertion hole passing through the duct 11 is provided for the air intake duct 11. By inserting and disposing the passage forming member 12 into the air intake duct 11 through this AFM insertion hole from outside the hole, the air flow measuring device 1 is attached to the air intake duct 11.

As a result of the attachment of the air flow measuring device 1 to the air intake duct 11, an air inlet 14a (inlet for air for the sub-air passage 14) provided for the passage forming member 12 is arranged toward an upstream side in a flow direction of intake air, and an air outlet 14b provided for the passage forming member 12 (outlet for air for the sub-air passage 14) is arranged toward a downstream side in the intake air flow direction. The passage forming member 12 is detachably attached to the air intake duct 11 via a fastening member (not shown) such as a screw.

The sub-air passage 14 is an air passage, and a part of air flowing through the inside of the air intake duct 11 passes through this air passage. The passage 14 is formed to be along the flow direction of intake air through the air intake duct 11. The above-described air inlet 14a is provided on the upstream side of the sub-air passage 14 in the intake air flow direction, and the above-described air outlet 14b is provided on the downstream side of the sub-air passage 14 in the intake air flow direction. An outlet throttle for reducing a flow of air passing through the sub-air passage 14 is provided for the air outlet 14b.

The secondary sub-air passage 2 includes an inlet 2a and an outlet 2b for returning an airflow which has passed through the secondary sub-air passage 2 into the air intake duct 11. A part of an airflow through the sub-air passage 14 which has been reduced by the outlet throttle flows into the inlet 2a. The passage 2 is configured as a bypass that rotates the air, which has flowed in through the inlet 2a, in the passage forming member 12 to return the air into the air intake duct 11. In this embodiment, it is illustrated that the outlet 2b of the secondary sub-air passage 2 is independently provided. However, the outlet 2b is not limited to this example. For example, the outlet 2b may open into the sub-air passage 14 to return the airflow, which has passed through the secondary sub-air passage 2, into the sub-air passage 14 again. Moreover, although it is illustrated in FIG. 1 that a straightening plate 15 is provided for the inlet 2a of the secondary sub-air passage 2, the straightening plate 15 does not need to be employed.

The sensor portion 3 is of an exothermic resistance type disposed at a front end portion of the sensor assy 13, and provided such that its air flow rate measuring portion is in contact with air. To show a specific example, by means of a heating resistor that generates heat upon energization and a temperature-sensitive resistor whose resistance value changes due to the temperature change, the sensor portion 3 measures an air flow rate using the change of the resistance value of the temperature-sensitive resistor (specifically, voltage change of the temperature-sensitive resistor due to its resistance value change). In this embodiment, a chip type (sensor module type having the shape of a generally flat plate) is used as a specific example. Needless to say, the sensor portion 3 is not limited to a chip type, and various types, for example, a winding wire type (bobbin type) can be applied to the sensor portion 3.

The sensor assy 13 including the sensor portion 3 is formed from a resin material similar to the passage forming member 12. As a result of its attachment to the passage forming member 12, the sensor portion 3 is disposed in a U-turn portion of the secondary sub-air passage 2. The sensor assy 13 may be bonded to the passage forming member 12 through an adhesive, welding technology or the like, or the sensor assy 13 may be detachably attached to the passage forming member 12 through a fastening member such as a screw.

A first characteristic technology of the embodiment will be described. The sensor portion 3 is arranged at as described above, the U-turn portion of the secondary sub-air passage 2, and the upstream bent portion 4 is provided for the secondary sub-air passage 2 on an upstream side (upstream side in measured air) of a sensor arrangement portion (region in which the sensor portion 3 is arranged). In this embodiment, the upstream throttle $\alpha$ is formed at the upstream bent portion 4. This upstream throttle $\alpha$ partly decreases a passage area along the passage of the upstream bent portion 4, and by providing the upstream throttle $\alpha$ at the upstream bent portion 4, an "upstream straightening effect" of straightening the airflow guided from the upstream bent portion 4 into the sensor arrangement portion is produced.

Specifically, in this embodiment, as described above, a part of air which flows through the sub-air passage 14 is guided into the secondary sub-air passage 2 for measurement. For this reason, disturbance of the airflow is easily caused at a branching part between the sub-air passage 14 and the secondary sub-air passage 2. Therefore, the disturbance of the airflow caused at the branching part between the sub-air passage 14 and the secondary sub-air passage 2 is straightened using the upstream straightening effect by the upstream throttle α. As a result, the turbulence of the airflow caused at the branching part (turbulence of the airflow on the upstream side of the sensor arrangement portion) can be straightened at the upstream bent portion 4 (upstream throttle α) upstream of the sensor arrangement portion, and output fluctuation of the sensor portion 3 can thereby be limited.

A second characteristic technology of the embodiment will be described. In this embodiment, the inner wall surface 4a of a bent part at the upstream bent portion 4 (upstream throttle α) is formed to be a smooth curved surface. As a specific example of the curved surface, in this embodiment, the inner wall surface 4a of the upstream bent portion 4 (upstream throttle α) is formed to be an R (radius) surface (surface formed into a circular arc: the circular arc is not limited to a true circle, and may include an ellipse and so forth). As above, by forming the inner wall surface 4a of the upstream bent portion 4 (upstream throttle α) to be a smooth curved surface (such as R surface), an "upstream exfoliation inhibitory effect" whereby a defect of exfoliation of air on the inner wall surface 4a is avoided can be produced. As a result, the output fluctuation of the sensor portion 3 due to the exfoliation of air on the inner wall surface 4a of the upstream bent portion 4 can be limited.

A third characteristic technology of the embodiment will be described. The upstream throttle α of this embodiment has the smallest passage area in the secondary sub-air passage 2 on the upstream side of the sensor portion 3. Accordingly, the above "upstream straightening effect" is produced at the upstream bent portion 4, and the disturbance of the airflow on the upstream side of the sensor arrangement portion can be straightened at the upstream bent portion 4. As a result, the output fluctuation of the sensor portion 3 can be restrained.

Figure 2:
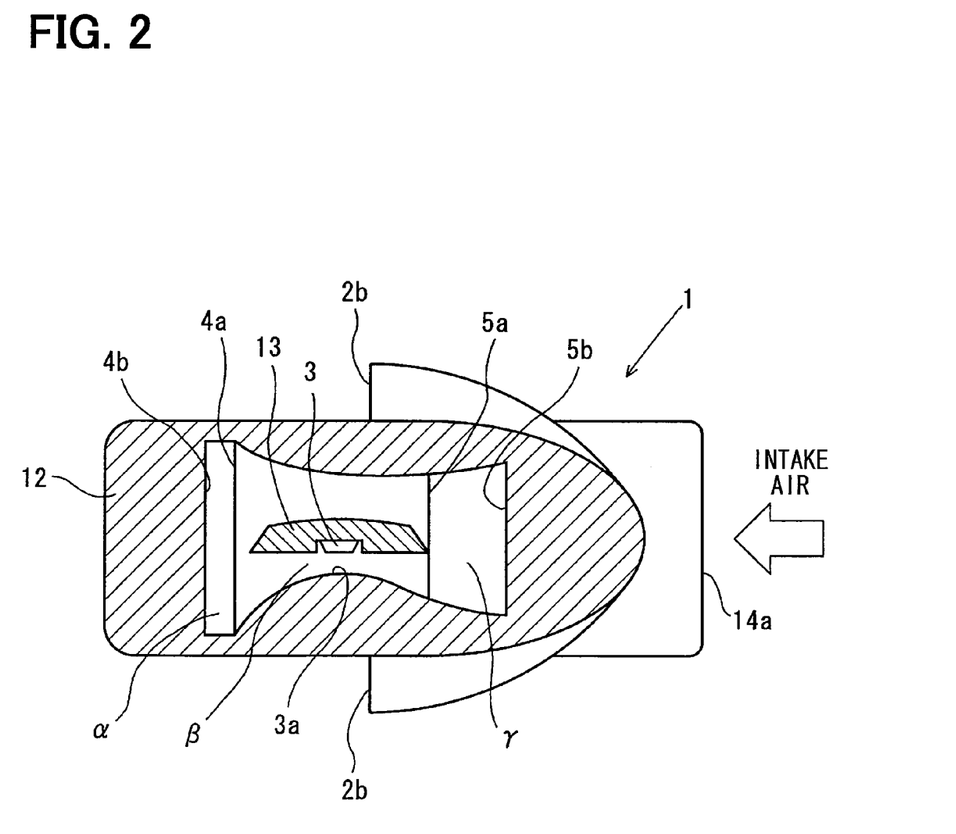
FIG. 2 is a cross-sectional view taken along a line II-II in FIG. 1.

A fourth characteristic technology of the embodiment will be described. A sensor throttle β that decreases a passage area is provided at the sensor arrangement portion of this embodiment. Specifically, the sensor throttle β of this embodiment is obtained by swelling a chip opposing wall surface 3a opposed to the sensor portion 3 (chip) (part of a wall surface defining the secondary sub-air passage 2) toward the sensor portion 3 as illustrated in FIG. 2. The sensor throttle β formed between the sensor portion 3 (chip) and the chip opposing wall surfaces 3a serves as a flat passage which is along the flow direction of air (air streamline direction).

On the other hand, the upstream throttle α reduces air passage by narrowing a parallel distance between the inner wall surface 4a of the upstream bent portion 4 and its outer wall surface 4b. The upstream throttle α also serves as the flat passage which is along the flow direction of air (air streamline direction).

As described above, the upstream throttle α and the sensor throttle β both serve as the flat passage, and flattening directions of the upstream throttle α and the sensor throttle β are perpendicularly arranged. Specifically, when a streamline direction of air which flows through the secondary sub-air passage 2 is referred to as a direction x, and a flattening direction of the sensor throttle β (flattening direction with respect to the direction x) is referred to as a direction y (longitudinal direction), a flattening direction of the upstream throttle α (flattening direction with respect to the direction x) is arranged in a direction z (lateral direction) that is perpendicular to the direction y (longitudinal direction). The directions x, y, z (longitudinally and lateral directions) are directions for assisting in understanding the positional relationship, and are not shown.

As above, by perpendicularly arranging the flattening directions of the upstream throttle α and the sensor throttle β, as compared with the case of convergence of the reductions of the airflow at one point of the sensor arrangement portion, the reductions of air are spread among the upstream throttle α and the sensor throttle β. Accordingly, a "passage resistance inhibitory effect" whereby the increase of passage resistance of the secondary sub-air passage 2 is prevented, is produced.

By making perpendicular to each other the flattening directions of the upstream throttle α and the sensor throttle β, an "upstream three-dimensional straightening effect" of three-dimensionally straightening the airflow guided to the sensor portion 3 can be produced. As a result, the airflow guided to the sensor portion 3 can be stabilized, and the output fluctuation of the sensor portion 3 can be restrained.

Figure 3A:
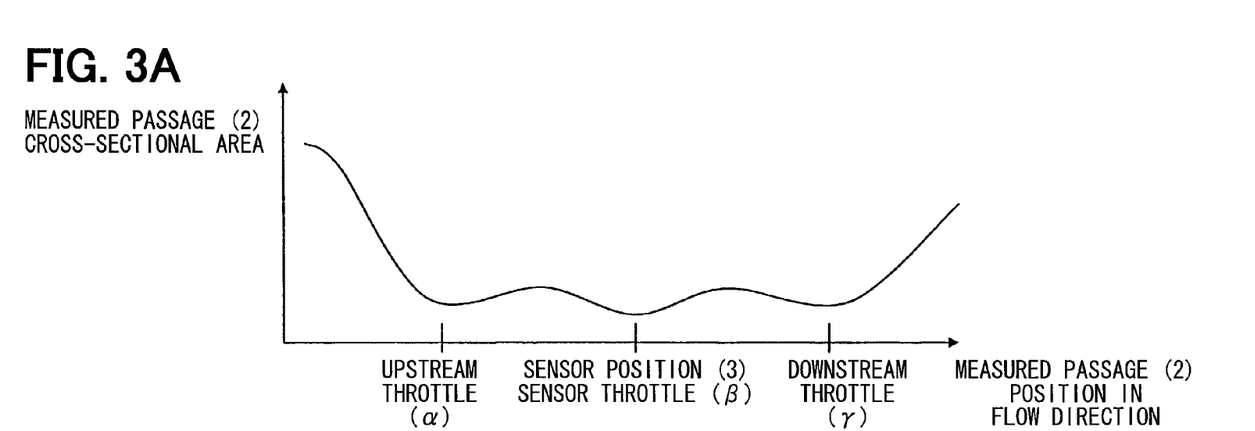
FIG. 3A is a diagram illustrating a relationship between a passage position of a measured air passage and a passage area of the measured air passage according to the embodiment.
Figure 3B:
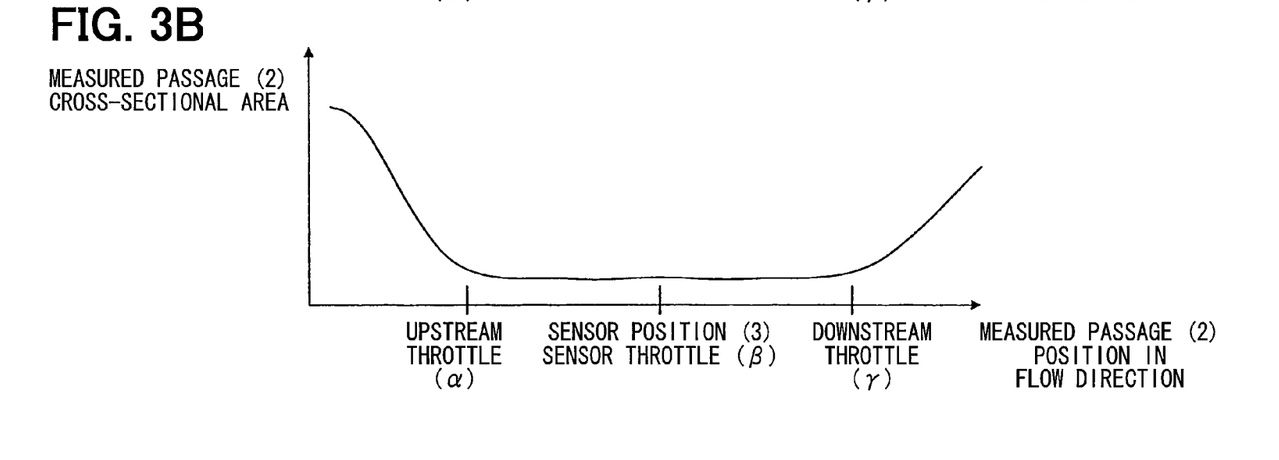
FIG. 3B is a diagram illustrating the relationship between the passage position of the measured air passage and the passage area of the measured air passage according to the embodiment.

A fifth characteristic technology of the embodiment will be described. In this embodiment, the upstream throttle α and the sensor throttle β are provided continuously in the flow direction of air. Specifically, as illustrated in FIG. 3A, an air reduction range in the upstream throttle α and an air reduction range in the sensor throttle β overlap with each other. Or, as illustrated in FIG. 3B, the passage 2 is formed continuously from the smallest throttle portion in the upstream throttle α to the smallest throttle portion in the sensor throttle β.

Consequently, a "sensor upstream passage expansion preventive effect" of preventing a significant increase of the passage area before the airflow which has been reduced by the upstream throttle α reaches the sensor throttle β is produced. As a result, the disturbance of the airflow due to expansion of the passage area between the upstream throttle α and the sensor throttle β can be prevented, and the output fluctuation of the sensor portion 3 can thereby be restrained.

A sixth characteristic technology of the embodiment will be described. The sensor portion 3 is disposed at the U-turn portion of the secondary sub-air passage 2 as described above. The downstream bent portion 5 is provided at the secondary sub-air passage 2 on the downstream side (downstream side in the measured air) of the sensor arrangement portion. In this embodiment, a downstream throttle γ is provided for the downstream bent portion 5. This downstream throttle γ partly reduces the passage area along the passage of the downstream bent portion 5, and the sensor throttle β and the downstream throttle γ are provided continuously in the flow direction of the measured air.

Specifically, similar to the above-described continuous formation of the upstream throttle α and the sensor throttle β, the air reduction range in the sensor throttle β and an air reduction range in the downstream throttle γ overlap with each other. Or, the continuous formation from the smallest throttle portion in the sensor throttle β to the smallest throttle portion in the downstream throttle γ is provided.

Accordingly, a "sensor downstream disturbance preventive effect" of preventing the disturbance of the airflow caused due to the increase of the passage area on the downstream side of the sensor throttle β is produced. As a consequence, the output fluctuation of the sensor portion 3 caused due to the disturbance of the airflow on the downstream side of the sensor throttle β can be limited.

A seventh characteristic technology of the embodiment will be described. As shown in the above fourth characteristic technology, the sensor throttle β serves as the flat passage which is along the flow direction of air (air streamline direction). On the other hand, the downstream throttle γ narrows a parallel distance between the inner wall surface 5a of the downstream bent portion 5 and its outer wall surface 5b to reduce the air passage. The downstream throttle γ also serves as the flat passage which is along the flow direction of air (air streamline direction).

As described above, the sensor throttle β and the downstream throttle γ both serve as the flat passage, and flattening directions of the sensor throttle β and the downstream throttle γ are perpendicularly arranged. Specifically, when the streamline direction of air which flows through the secondary sub-air passage 2 is referred to as the direction x and the flattening direction of the sensor throttle β (flattening direction with respect to the direction x) is referred to as the direction y (longitudinal direction), the flattening direction of the downstream throttle γ (flattening direction with respect to the direction x) is arranged in the direction z (lateral direction) that is perpendicular to the direction y (longitudinal direction).

Accordingly, a "downstream three-dimensional straightening effect" of three-dimensionally straightening the airflow from the sensor portion 3 to the downstream side is produced. As a result, the airflow passing through the sensor portion 3 can be stabilized, and the output fluctuation of the sensor portion 3 can be restrained.

An eighth characteristic technology of the embodiment will be described. In this embodiment, the downstream throttle γ is provided for the downstream bent portion 5, and the inner wall surface 5a of the downstream bent portion 5 is formed to be a smooth curved surface. As a specific example of the curved surface, in this embodiment, the inner wall surface 5a of the downstream bent portion 5 (downstream throttle γ) is formed to be an R (radius) surface (surface formed into a circular arc: the circular arc is not limited to a true circle, and may include an ellipse and so forth). As above, by forming the inner wall surface 5a of the downstream bent portion 5 (downstream throttle γ) to be a smooth curved surface (such as R surface), a "downstream exfoliation inhibitory effect" whereby a defect of exfoliation of air on the inner wall surface 5a of the downstream bent portion 5 (downstream throttle γ) is avoided, can be produced. As a result, generation of the disturbance of the airflow due to the exfoliation of air on the inner wall surface 5a of the downstream bent portion 5 can be prevented to limit the output fluctuation of the sensor portion 3.

Industrial applicability of the air flow measuring device 1 will be described. In the above-described embodiment, the inner wall surface 4a of the upstream bent portion 4 is formed to be a gradual curved surface (R surface), so that the exfoliation of air is restrained. Alternatively, the passage forming member 12 may be downsized by increasing a bending degree of the inner wall surface 4a. Similarly, the inner wall surface 5a of the downstream bent portion 5 is formed to be a gradual curved surface (R surface), so that the exfoliation of air is restrained. Alternatively, the passage forming member 12 may be compactified by increasing a bending degree of the inner wall surface 5a.

In the above-described embodiment, it is illustrated that the upstream throttle α is provided by narrowing the clearance between the inner wall surface 4a and the outer wall surface 4b of the upstream bent portion 4. Alternatively, the upstream throttle α may be provided by disposing a straightening plate having a generally streamline shape between the inner wall surface 4a and the outer wall surfaces 4b at the upstream bent portion 4.

Similarly, in the above-described embodiment, it is illustrated that the downstream throttle γ is provided by narrowing the clearance between the inner wall surface 5a and the outer wall surface 5b of the downstream bent portion 5. Alternatively, the downstream throttle γ may be provided by disposing a straightening plate having a generally streamline shape between the inner wall surface 5a and the outer wall surface 5b of the downstream bent portion 5.

In the above-described embodiment, it is illustrated that the present disclosure is applied to the air flow measuring device 1 in which the two air passages (the sub-air passage 14 and the secondary sub-air passage 2) are formed inside the passage forming member 12. Alternatively, the present disclosure may be applied to the air flow measuring device 1 in which only one air passage (measured passage 2) is formed inside the passage forming member 12.

In the above-described embodiment, it is illustrated that the flow direction of the measured air passing by the sensor portion 3 is in the opposite direction from the flow direction of air which flows through the air intake duct 11. However, the flow direction of the measured air passing by the sensor portion 3 is not limited. The direction may be, for example, a forward direction that is along the flow direction of air which flows through the air intake duct 11, or a perpendicular direction relative to the flow direction of air which flows through the air intake duct 11.

In the above-described embodiment, it is illustrated that the present disclosure is applied to the air flow measuring device 1 that measures the intake air amount of the engine for vehicle traveling. Alternatively, the use of the present disclosure is not limited to the air flow measuring device 1 for the engine for vehicle traveling, and the present disclosure may be applied to the air flow measuring device 1 for other uses.

To sum up, the air flow measuring device 1 of the above embodiment can be described as follows.

In the air flow measuring device 1 of a first aspect, the upstream throttle α that partly reduces the passage area is provided in the passage of the upstream bent portion 4 on the upstream side of the sensor arrangement portion. By providing the upstream throttle α for the upstream bent portion 4, the upstream straightening effect of straightening the airflow guided to the sensor arrangement portion at the upstream throttle α is produced. As a result, output fluctuation of the sensor portion 3 due to the disturbance of the airflow on the upstream side of the sensor arrangement portion can be limited.

As for the upstream throttle α of a second aspect, the inner wall surface 4a of a bent portion is formed to be a smooth curved surface (such as R surface). By forming the inner wall surface 4a of the upstream throttle α to be a smooth curved surface, the upstream exfoliation inhibitory effect of avoiding a defect of exfoliation of air on the inner wall surface 4a is produced. As a result, the output fluctuation of the sensor portion 3 due to the exfoliation of air on the inner wall surface 4a of the upstream bent portion 4 can be limited.

The passage area of the upstream throttle α of a third aspect is the smallest in the measured passage 2 on the upstream side of the sensor portion 3.

The upstream throttle α and the sensor throttle β (throttle that reduces the passage area in the sensor arrangement portion) of a fourth aspect are respectively provided as a flat passage. Flattening directions of the upstream throttle α and the sensor throttle β are perpendicularly arranged. As compared with the case of convergence of the reductions of the airflow at one point of the sensor arrangement portion, the reductions are spread between the upstream throttle α and the sensor throttle β. Accordingly, the passage resistance inhibitory effect of preventing the increase of passage resistance of the measured passage 2 is produced.

By making perpendicular to each other the flattening directions of the upstream throttle α and the sensor throttle β, an "upstream three-dimensional straightening effect" of three-dimensionally straightening the airflow guided to the sensor portion 3 can be produced. As a result, the airflow guided to the sensor portion 3 can be stabilized, and the output fluctuation of the sensor portion 3 can be restrained.

In the air flow measuring device 1 of a fifth aspect, the upstream throttle α and the sensor throttle β are provided continuously in the flow direction of measured air. Consequently, a "sensor upstream passage expansion preventive effect" of preventing a significant increase of the passage area before the airflow which has been reduced by the upstream throttle α reaches the sensor throttle β is produced. As a result, the disturbance of the airflow due to expansion of the passage area between the upstream throttle α and the sensor throttle β can be prevented, and the output fluctuation of the sensor portion 3 can thereby be restrained.

In the air flow measuring device 1 of a sixth aspect, the sensor throttle β and the downstream throttle γ (throttle that reduces the passage area in the measured passage 2 on the downstream side of the sensor arrangement portion) are provided continuously in the flow direction of measured air. Accordingly, a "sensor downstream disturbance preventive effect" of preventing the disturbance of the airflow caused due to the increase of the passage area on the downstream side of the sensor throttle β is produced. As a consequence, the output fluctuation of the sensor portion 3 caused due to the disturbance of the airflow on the downstream side of the sensor throttle β can be limited.

In the air flow measuring device 1 of a seventh aspect, the sensor throttle β and the downstream throttle γ are configured as flat passages, and flattening directions of the sensor throttle β and the downstream throttle γ are perpendicularly arranged. Accordingly, a "downstream three-dimensional straightening effect" of three-dimensionally straightening the airflow from the sensor portion 3 to the downstream side is produced. As a result, the airflow passing through the sensor portion 3 can be stabilized, and the output fluctuation of the sensor portion 3 can be restrained.

The air flow measuring device 1 of an eighth aspect is a combination of the sixth and seventh aspects with the first and second aspects. Accordingly, in addition to the effects of the sixth and seventh aspects, the effects of the first and second aspects can be produced.

In the air flow measuring device 1 of a ninth aspect, the downstream throttle γ that partly reduces the passage area is provided in the passage of the downstream bent portion on the downstream side (downstream side in the measured air flow direction) of the sensor arrangement portion. By providing the downstream throttle γ for the downstream bent portion 5, the downstream straightening effect of straightening the airflow at the downstream throttle γ is produced. As a result, output fluctuation of the sensor portion 3 due to the disturbance of the airflow on the downstream side of the sensor arrangement portion can be limited.

As for the downstream throttle γ of a tenth aspect, the inner wall surface 5a of the bent portion is formed to be a smooth curved surface (such as R surface). By forming the inner wall surface 5a of the downstream throttle γ to be a smooth curved surface, the downstream exfoliation inhibitory effect of avoiding a defect of exfoliation of air on the inner wall surface 5a is produced. As a result, generation of the disturbance of the airflow due to the exfoliation of air on the inner wall surface 5a of the downstream bent portion 5 can be prevented to limit the output fluctuation of the sensor portion 3.

The air flow measuring device 1 of an eleventh aspect is a combination of the ninth and tenth aspects with the first and second aspects. Accordingly, in addition to the effects of the ninth and tenth aspects, the effects of the first and second aspects can be produced.

A twelfth aspect illustrates a specific example of the air flow measuring device 1. The passage forming member 12 that defines the measured passage 2 includes the sub-air passage 14 and the secondary sub-air passage 2. A part of air flowing in the air intake duct 11, which guides intake air to the engine, passes through the passage 14. A part of air guided to this sub-air passage 14 passes through the passage 2. The secondary sub-air passage 2 may correspond to the measured passage 2, and the air which flows through the secondary sub-air passage 2 may correspond to the measured air.

In addition, by a combination of this twelfth aspect with the aspect which provides the upstream throttle α (any one of the first to fifth aspects, eighth aspect and eleventh aspect), the disturbance of the airflow caused at the branching part between the sub-air passage 14 and the secondary sub-air passage 2 is straightened using the upstream straightening effect by the upstream throttle α. As a result, output fluctuation of the sensor portion 3 due to the disturbance of the airflow caused at the branching part can be limited.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device comprising:
   a measured passage through which measured air which is a measuring object flows; and
   a sensor portion that is disposed in a sensor arrangement portion of the measured passage and is configured to measure a flow rate of measured air flowing through the measured passage, wherein:
   the measured passage includes an upstream bent portion on an upstream side of the sensor arrangement portion in a flow direction of measured air; and
   the upstream bent portion includes an upstream throttle that partly decreases a passage area of the measured passage,
   wherein a flow direction of the measured air changes as the measured air passes through a narrowest point of the upstream throttle.

2. The air flow measuring device according to claim 1, wherein the upstream throttle includes an inner wall surface which is a smooth curved surface.

3. The air flow measuring device according to claim 1, wherein the upstream throttle has the smallest passage area in the measured passage on an upstream side of the sensor portion in the flow direction of measured air.

4. The air flow measuring device according to claim 1, wherein:
   the sensor arrangement portion includes a sensor throttle that decreases the passage area;
   the upstream throttle and the sensor throttle are formed respectively as flat passages; and flattening directions of the upstream throttle and the sensor throttle are arranged perpendicularly to each other.

5. The air flow measuring device according to claim 1, wherein:
the sensor arrangement portion includes a sensor throttle that decreases the passage area; and
the upstream throttle and the sensor throttle are formed continuously in the flow direction of measured air.

6. The air flow measuring device according to claim 1, wherein the air flow measuring device is adapted to be attached to an air intake duct which guides intake air to an engine, the air flow measuring device further comprising a passage forming member that defines the measured passage and a sub-air passage, wherein:
a part of air flowing in the air intake duct passes through the sub-air passage; and
a part of air guided into the sub-air passage passes through the measured passage.

7. The air flow measuring device according to claim 1, wherein a center of the narrowest point of the upstream throttle is disposed at a center of the upstream bent portion.

8. The air flow measuring device according to claim 1, wherein a center of the narrowest point of the upstream throttle is not disposed at a center of the upstream bent portion.

9. An air flow measuring device comprising:
a measured passage through which measured air which is a measuring object flows; and
a sensor portion that is disposed in a sensor arrangement portion of the measured passage and is configured to measure a flow rate of measured air flowing through the measured passage, wherein:
the sensor arrangement portion includes a sensor throttle that decreases a passage area of the measured passage;
the measured passage on a downstream side of the sensor arrangement portion in a flow direction of measured air includes a downstream throttle that decreases the passage area; and
the sensor throttle and the downstream throttle together form a continuous throttle in the flow direction of measured air.

10. The air flow measuring device according to claim 9, wherein:
the sensor throttle and the downstream throttle are formed respectively as flat passages; and
flattening directions of the sensor throttle and the downstream throttle are arranged perpendicularly to each other.

11. The air flow measuring device according to claim 9, wherein:
the measured passage includes an upstream bent portion on an upstream side of the sensor arrangement portion in the flow direction of measured air; and
the upstream bent portion includes an upstream throttle that partly decreases the passage area.

12. The air flow measuring device according to claim 11, wherein the upstream throttle includes an inner wall surface which is a smooth curved surface.

13. The air flow measuring device according to claim 9, wherein the air flow measuring device is adapted to be attached to an air intake duct which guides intake air to an engine, the air flow measuring device further comprising a passage forming member that defines the measured passage and a sub-air passage, wherein:
a part of air flowing in the air intake duct passes through the sub-air passage; and
a part of air guided into the sub-air passage passes through the measured passage.

14. An air flow measuring device comprising:
a measured passage through which measured air which is a measuring object flows; and
a sensor portion that is disposed in a sensor arrangement portion of the measured passage and is configured to measure a flow rate of measured air flowing through the measured passage, wherein:
the measured passage includes a downstream bent portion on a downstream side of the sensor arrangement portion in a flow direction of measured air; and
the downstream bent portion includes a downstream throttle that partly decreases a passage area of the measured passage,
wherein a flow direction of the measured air changes as the measured air passes through a narrowest point of the downstream throttle.

15. The air flow measuring device according to claim 14, wherein the downstream throttle includes an inner wall surface which is a smooth curved surface.

16. The air flow measuring device according to claim 14, wherein:
the measured passage further includes an upstream bent portion on an upstream side of the sensor arrangement portion in the flow direction of measured air; and
the upstream bent portion includes an upstream throttle that partly decreases the passage area.

17. The air flow measuring device according to claim 16, wherein the upstream throttle includes an inner wall surface which is a smooth curved surface.

18. The air flow measuring device according to claim 14, wherein the air flow measuring device is adapted to be attached to an air intake duct which guides intake air to an engine, the air flow measuring device further comprising a passage forming member that defines the measured passage and a sub-air passage, wherein:
a part of air flowing in the air intake duct passes through the sub-air passage; and
a part of air guided into the sub-air passage passes through the measured passage.

19. The air flow measuring device according to claim 14, wherein a center of the narrowest point of the downstream throttle is disposed at a center of the downstream bent portion.

20. The air flow measuring device according to claim 14, wherein a center of the narrowest point of the downstream throttle is not disposed at a center of the downstream bent portion.

* * * * *